(12) United States Patent
Osakada et al.

(10) Patent No.: US 8,431,663 B2
(45) Date of Patent: *Apr. 30, 2013

(54) POLYMER AND METHOD FOR PRODUCING SAME

(75) Inventors: Kohtaro Osakada, Yokohama (JP); Daisuke Takeuchi, Yokohama (JP); Osamu Ihata, Ichihara (JP); Hirofumi Johoji, Ichihara (JP)

(73) Assignees: Tokyo Institute of Technology, Tokyo (JP); Sumitomo Chemical Company, Limited, Tokyo (JP)

( * ) Notice: Subject to any disclaimer, the term of this patent is extended or adjusted under 35 U.S.C. 154(b) by 188 days.

This patent is subject to a terminal disclaimer.

(21) Appl. No.: 13/072,033

(22) Filed: Mar. 25, 2011

(65) Prior Publication Data
US 2011/0245441 A1 Oct. 6, 2011

(30) Foreign Application Priority Data
Mar. 30, 2010 (JP) .................. 2010-079320

(51) Int. Cl.
*C08F 10/14* (2006.01)
(52) U.S. Cl.
USPC ........................................................ 526/172
(58) Field of Classification Search .............. 526/172
See application file for complete search history.

(56) References Cited

U.S. PATENT DOCUMENTS

| 2002/0045536 A1* | 4/2002 | Sita et al. ................ 502/104 |
| 2008/0221286 A1 | 9/2008 | Osakada et al. |

FOREIGN PATENT DOCUMENTS

| JP | 2003026718 A | 1/2003 |
| JP | 2008239975 A | 10/2008 |
| JP | 2009227995 A | 10/2009 |

OTHER PUBLICATIONS

W.H. McCarty, et al. "Polymerization of Vinylcyclohexane with TiCl3-Al(C2H5)3 Catalysts" Journal of Polymer Science: Part A, vol. 3, pp. 4029-4046, (1965).
M. Fujita et al., "Synsthesis and Characterization of Alternating and Multiblock Copolymers from Ethylene and Cyclopentene" Macromolecules, No. 35, pp. 9640-9647, (2002).
S.J. McLain et al., "Communications to the Editor" Macromolecules, No. 31, pp. 6705-6707 (1998).
W.H. McArty, et al. "Polymerization of Vinylcyclohexane with TiCl3-Al(C2H5)3 Catalysts" Journal of Polymer Science: Part A, vol. 3, pp. 4029-4046, (1965).

* cited by examiner

*Primary Examiner* — Kuo-Liang Peng
(74) *Attorney, Agent, or Firm* — Panitch Schwarze Belisario & Nadel LLP

(57) ABSTRACT

A polymer and a method for producing same are provided, which includes a repeating unit represented by the following formula (1):

[Chem. 1]

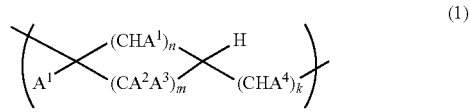

wherein: each of $A^1$, $A^2$, $A^3$, and $A^4$ independently represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; each of $A^1$, $A^2$, $A^3$, and $A^4$ is independently any of these groups at different carbons to which the each of $A^1$, $A^2$, $A^3$, and $A^4$ is bonded, and $A^1$, $A^2$, $A^3$, and $A^4$ may be bonded to each other; and each of m, n, and k is independently an integer in a range of 2 to 20.

12 Claims, No Drawings

POLYMER AND METHOD FOR PRODUCING SAME

This Nonprovisional application claims priority under 35 U.S.C. §119(a) on Patent Application No. 2010-079320 filed in Japan on Mar. 30, 2010, the entire contents of which are hereby incorporated by reference.

TECHNICAL FIELD

The present invention relates to a novel polymer and a method for producing the novel polymer, in particular to a novel polymer having a cyclic structure and a method for producing such a novel polymer.

BACKGROUND ART

Various polymers that contain cyclic structures in a main chain have been known. For example, Patent Literature 1 discloses a polymer that contains, in a main chain, a cyclopentane-1,3-diyl structure obtained by using an unconjugated diene compound as a monomer. Further, Patent Literature 2 discloses a polymer that contains, in a main chain, a cyclohexane-1,3-diyl structure obtained by using an unconjugated diene compound as a monomer. Furthermore, Patent Literature 3 discloses a cyclohexene addition polymer obtained by polymerization of a cyclohexene monomer with use of a catalyst made of a transition metal compound, an alkylaluminoxane and a boron compound.

CITATION LIST

Patent Literature

[Patent Literature 1]
Japanese Patent Application Publication, Tokukai, No. 2008-239975 (published on Oct. 9, 2008)
[Patent Literature 2]
Japanese Patent Application Publication, Tokukai, No. 2009-227995 (published on Oct. 8, 2009)
[Patent Literature 3]
Japanese Patent Application Publication, Tokukai, No. 2003-26718 (published on Jan. 29, 2003)

SUMMARY OF INVENTION

Technical Problem

In the above described polymers, bonding sites in the cyclic structure, which bonding sites are attached to the main chain of the polymer, are too close to each other. This consequently bends the main chain. Therefore, there is a strong demand for development of a novel polymer whose main chain structure having a cyclic structure is improved.

In order to solve the above problem, an object of the present invention is to provide a novel polymer and a method for producing the polymer.

Solution to Problem

A polymer of the present invention includes a repeating unit represented by a following formula (1):

[Chem. 1]

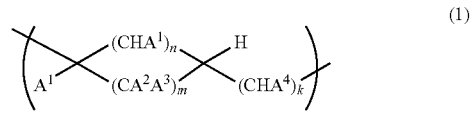

wherein: each of $A^1$, $A^2$, $A^3$, and $A^4$ independently represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; each of $A^1$, $A^2$, $A^3$, and $A^4$ is independently any of these groups at different carbons to which the each of $A^1$, $A^2$, $A^3$, and $A^4$ is bonded, and $A^1$, $A^2$, $A^3$, and $A^4$ may be bonded to each other; and each of m, n, and k is independently an integer in a range of 2 to 20.

A method for producing a polymer of the present invention which polymer includes a repeating unit represented by the above formula (1), the method includes the step of: polymerizing a compound represented by the following formula (5):

[Chem. 2]

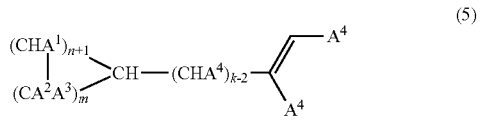

wherein: each of $A^1$, $A^2$, $A^3$, and $A^4$ independently represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; each of $A^1$, $A^2$, $A^3$, and $A^4$ is independently any of these groups at different carbons to which the each of $A^1$, $A^2$, $A^3$, and $A^4$ is bonded, and $A^1$, $A^2$, $A^3$, and $A^4$ may be bonded to each other; and each of m, n, and k is independently an integer in a range of 2 to 20.

Advantageous Effects of Invention

The present invention can provide a novel polymer.

DESCRIPTION OF EMBODIMENTS

<1. Polymer of Present Invention>
A polymer of the present invention includes a repeating unit represented by the following formula (1):

[Chem. 3]

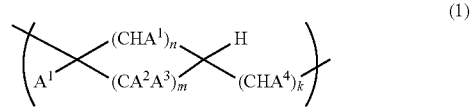

wherein: each of $A^1$, $A^2$, $A^3$, and $A^4$ should be independently a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; each of $A^1$, $A^2$, $A^3$, and $A^4$ is independently any of these groups at different carbons to which the each of $A^1$, $A^2$, $A^3$, and $A^4$ is bonded, and $A^1$, $A^2$, $A^3$, and $A^4$ may be bonded to each other; and each of m, n, and k should be independently an integer in a range of 2 to 20.

Examples of the halogen atom of $A^1$, $A^2$, $A^3$, and $A^4$ in the above formula (1) encompass a fluorine atom, a chlorine atom, a bromine atom, and an iodine atom. In particular, the halogen atom is preferably a fluorine atom.

Examples of the alkyl group of $A^1$, $A^2$, $A^3$, and $A^4$ in the above formula (1) encompass a straight chain alkyl group, a branched alkyl group, and a cyclic alkyl group. Examples of the straight chain alkyl group encompass a methyl group, an ethyl group, and an n-butyl group. Examples of the branched alkyl group encompass an isopropyl group, an isobutyl group, a tert-butyl group and a neopentyl group. Examples of the cyclic alkyl group encompass a cyclohexyl group and a cyclooctyl group. The alkyl group may have a substituent. Examples of the substituent encompass a halogen atom, a hydrocarbon oxy group, a nitro group, a sulfonate group, and a cyano group.

Examples of the aralkyl group of $A^1$, $A^2$, $A^3$, and $A^4$ in the above formula (1) encompass a benzyl group, a phenethyl group, a 2-methylbenzyl group, a 3-methylbenzyl group, a 4-methylbenzyl group, a 2,6-dimethylbenzyl group, and a 3,5-dimethylbenzyl group. The aralkyl group may have a substituent. Examples of the substituent encompass a halogen atom, a hydrocarbon oxy group, a nitro group, a sulfonate group, a silyl group, and a cyano group.

Examples of the aryl group of $A^1$, $A^2$, $A^3$, and $A^4$ in the above formula (1) encompass a phenyl group, a tolyl group, and a mesityl group. The aryl group may have a substituent. Examples of the substituent encompass a halogen atom, a hydrocarbon oxy group, a nitro group, a sulfonate group, a silyl group, and a cyano group.

The silyl group of $A^1$, $A^2$, $A^3$, and $A^4$ in the above formula (1) may have a substituent. Examples of a substituted silyl group encompass a single substituted silyl group, a disubstituted silyl group, and a trisubstituted silyl group. Examples of the single substituted silyl group encompass a methylsilyl group, an ethylsilyl group, and a phenylsilyl group. Examples of the disubstituted silyl group encompass a dimethylsilyl group, a diethylsilyl group, and a diphenylsilyl group. Examples of the trisubstituted silyl group encompass a trimethylsilyl group, a trimethoxysilyl group, a dimethylmethoxysilyl group, a methyldimethoxysilyl group, a triethylsilyl group, a triethoxysilyl group, a tri-n-propylsilyl group, a triisopropylsilyl group, a tri-n-butylsilyl group, a tri-sec-butylsilyl group, a tert-butyldimethylsilyl group, a triisobutylsilyl group, a tert-butyldiphenylsilyl group, an n-hexyldimethylsilyl group, a tricyclohexylsilyl group, and a triphenylsilyl group. The substituted silyl group may additionally have another substituent. Examples of the substituent encompass a halogen atom, a hydrocarbon oxy group, a nitro group, a sulfonate group, and a cyano group.

The siloxy group of $A^1$, $A^2$, $A^3$, and $A^4$ in the above formula (1) may have a substituent. Examples of a substituted siloxy group encompass siloxy groups such as a trimethylsiloxy group, a trimethoxysiloxy group, a dimethylmethoxysiloxy group, a methyldimethoxysiloxy group, a triethylsiloxy group, a triethoxysiloxy group, a tri-n-propylsiloxy group, a triisopropylsiloxy group, a tri-n-butylsiloxy group, a tri-sec-butylsiloxy group, a tert-butyldimethylsiloxy group, a triisobutylsiloxy group, a tert-butyldiphenylsiloxy group, an n-hexyldimethylsiloxy group, a tricyclohexylsiloxy group, and a triphenylsiloxy group. The substituted siloxy group may additionally have another substituent. Examples of the substituent encompass a halogen atom, a hydrocarbon oxy group, a nitro group, a sulfonate group, and a cyano group.

Examples of the alkoxy group of $A^1$, $A^2$, $A^3$, and $A^4$ in the above formula (1) encompass a straight chain alkoxy group, a branched alkoxy group, and a cyclic alkoxy group. Examples of the straight chain alkoxy group encompass a methoxy group, an ethoxy group, and an n-butoxy group. Examples of the branched alkoxy group encompass an isopropoxy group, an isobutoxy group, a tert-butoxy group, and a neopentoxy group. Examples of the cyclic alkoxy group encompass a cyclohexyloxy group and a cyclooctyloxy group. The alkoxy group may have a substituent. Examples of the substituent encompass a halogen atom, a hydrocarbon oxy group, a nitro group, a sulfonate group, a silyl group, and a cyano group.

Examples of the aralkyloxy group of $A^1$, $A^2$, $A^3$, and $A^4$ in the above formula (1) encompass a benzyloxy group, a phenethyloxy group, a 2-methylbenzyloxy group, a 3-methylbenzyloxy group, a 4-methylbenzyloxy group, a 2,6-dimethylbenzyloxy group, and a 3,5-dimethylbenzyloxy group. The aralkyloxy group may have a substituent. Examples of the substituent encompass a halogen atom, a hydrocarbon oxy group, a nitro group, a sulfonate group, a silyl group, and a cyano group.

Examples of the aryloxy group of $A^1$, $A^2$, $A^3$, and $A^4$ in the above formula (1) encompass a phenoxy group, a 2-methylphenoxy group, a 2-ethylphenoxy group, a 2-n-propylphenoxy group, a 2-isopropylphenoxy group, a 2-n-butylphenoxy group, a 2-isobutylphenoxy group, a 2-tert-butylphenoxy group, a 3-methylphenoxy group, a 3-isopropylphenoxy group, a 3-n-butylphenoxy group, a 3-tert-butylphenoxy group, a 4-methylphenoxy group, a 4-isopropylphenoxy group, a 4-n-butylphenoxy group, a 4-tert-butylphenoxy group, a 2,3-dimethylphenoxy group, a 2,4-dimethylphenoxy group, a 2,5-dimethylphenoxy group, a 2,6-dimethylphenoxy group, a 3,5-dimethylphenoxy group, a 2,6-diisopropylphenoxy group, a 2,6-di-tert-butylphenoxy group, and a naphthoxy group. The aryloxy group may have a substituent. Examples of the substituent encompass a halogen atom, a hydrocarbon oxy group, a nitro group, a sulfonate group, a silyl group, and a cyano group.

The amino group of $A^1$, $A^2$, $A^3$, and $A^4$ in the above formula (1) may have a substituent. Examples of a substituted amino group encompass a straight chain alkylamino group, a branched alkylamino group, and a cyclic alkylamino group. Examples of the straight chain alkylamino group encompass an N-methylamino group, an N-ethylamino group, an N-n-butylamino group, an N,N-dimethylamino group, an N,N-diethylamino group, and an N,N-di-n-butylamino group. Examples of the branched alkylamino group encompass an N,N-diisopropylamino group, an N,N-diisobutylamino group, an N,N-di-tert-butylamino group, and an N,N-dineopentylamino group. Examples of the cyclic alkylamino group encompass an N,N-dicyclohexylamino group, and an N,N-dicyclooctylamino group. The substituted amino group may additionally have another substituent. Examples of the substituent encompass a halogen atom, a hydrocarbon oxy group, a nitro group, a sulfonate group, and a cyano group.

The amide group of $A^1$, $A^2$, $A^3$, and $A^4$ in the above formula (1) may have a substituent. Examples of a substituted amide group encompass amide groups such as an ethanamide group, an N-n-butylethanamide group, an N-methylethanamide group, an N-ethylethanamide group, an N-n-butylhexanamide group, an isopropanamide group, an isobutanamide group, a tert-butanamide group, a neopentanamide group, a cyclohexanamide group, and a cyclooctanamide group. The substituted amide group may additionally have another substituent. Examples of the substituent encompass a halogen atom, a hydrocarbon oxy group, a nitro group, a sulfonate group, and a cyano group.

The imide group of $A^1$, $A^2$, $A^3$, and $A^4$ in the above formula (1) may have a substituent. Examples of a substituted imide group encompass imide groups such as a succinimide group, a maleimide group, and a phthalimide group. The substituted imide group may additionally have another substituent. Examples of the substituent encompass a halogen atom, a hydrocarbon oxy group, a nitro group, a sulfonate group, and a cyano group.

Examples of the hydrocarbon thio group of $A^1$, $A^2$, $A^3$, and $A^4$ in the above formula (1) encompass a straight chain hydrocarbon thio group, a branched hydrocarbon thio group, and a cyclic hydrocarbon thio group. Examples of the straight chain hydrocarbon thio group encompass a methylthio group, an ethylthio group, and an n-butylthio group. Examples of the branched hydrocarbon thio group encompass an isopropylthio group, an isobutylthio group, a tert-butylthio group, and a neopentylthio group. Examples of the cyclic hydrocarbon thio group encompass a cyclohexylthio group, and a cyclooctylthio group. The hydrocarbon thio group may have a substituent. Examples of the substituent encompass a halogen atom, a hydrocarbon oxy group, a nitro group, a sulfonate group, a silyl group, and a cyano group.

In the above formula (1), each of m, n, and k should be independently an integer in a range of 2 to 20. Preferably, each of m and n is independently in a range of 2 to 8, and more preferably, in a range of 2 to 4. Preferably, k is in a range of 2 to 10, and more preferably, in a range of 2 to 8.

The polymer of the present invention may contain one or more kinds of repeating units as long as each of the repeating units is represented by the above formula (1). A polymer containing one kind of repeating unit represented by the above formula (1) can be obtained as a homopolymer prepared by polymerization of only one kind of monomer described later. Further, a polymer containing two or more kinds of repeating units each represented by the above formula (1) can be obtained, for example, as a copolymer prepared by polymerization of two or more kinds of monomers described later.

In the polymer of the present invention, in a cyclic repeating unit represented by the above formula (1), bonding sites bonded to the main chain is apart from each other by the carbon chain lengths of m carbon atoms and n carbon atoms and are not close to each other. Therefore, it is expected that the problem of bending of the main chain having a cyclic structure can be solved to a certain extent.

Further, in the polymer of the present invention, the repeating unit represented by the above formula (1) may be a repeating unit represented by the following formula (2):

[Chem. 4]

(2)

wherein: each of $A^1$, $A^2$, $A^3$, and $A^4$ should be independently a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; each of $A^1$, $A^2$, $A^3$, and $A^4$ is independently any of these groups at different carbons to which the each of $A^1$, $A^2$, $A^3$, and $A^4$ is bonded, and $A^1$, $A^2$, $A^3$, and $A^4$ may be bonded to each other; and each of m, n, and k should be independently an integer in a range of 2 to 20.

Further, in the polymer of the present invention, the repeating unit represented by the above formula (1) may be a repeating unit represented by the following formula (3):

[Chem. 5]

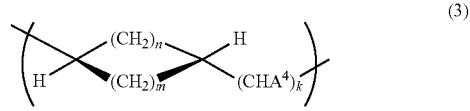

(3)

wherein: $A^4$ should be a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; and each of m, n, and k should be independently an integer in a range of 2 to 20.

Further, in the polymer of the present invention, the repeating unit represented by the above formula (1) may be a repeating unit represented by the following formula (4):

[Chem. 6]

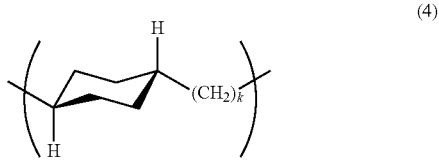

(4)

wherein: k should be a natural number in a range of 2 to 20. More preferably, k is an integer in a range of 2 to 10; most preferably, k is an integer in a range of 2 to 8.

As shown in the above formulae (2), (3) and (4), the polymer of the present invention may include a main chain steric structure with repeating units in which the portions of the main chain are bonded to the cyclic structure in a trans configuration. The above trans configuration may be 1,4-trans configuration as shown by the above formula (4). Hereinafter, the repeating units of the structure shown by each of the formulae (2), (3), and (4) may be referred to as trans-configuration repeating units, whereas repeating units whose main chain portions are bonded in a cis configuration may be referred to as cis-configuration repeating units which main chain portions are in cyclic structures of the respective repeating units.

The polymer of the present invention may be formed so as to include repeating units which are all the cis-configuration repeating units or trans-configuration repeating units, or which include the cis-configuration repeating units and trans-configuration repeating units mixedly.

In view of resistance to heat, in the main chain steric structure of the polymer of the present invention, preferably, 70 mol % to 100 mol % of repeating units are trans-configuration repeating units and more preferably, substantially 100 mol % of repeating units are the trans-configuration repeating units, in a case where a total amount of repeating units in the polymer is 100 mol %. The main chain steric structure of the polymer of the present invention can be measured by a well-known measurement method. For example, the main chain steric structure may be measured, for example, by using $^{13}$C-NMR.

A $^{13}$C-NMR spectrum of the polymer is attributed to its molecular structure by applying books (for example, R. M. Silverstein "The identification methods of organic compounds from their spectra, 6th edition, the combination of MS, IR and NMR", Tokyo kagaku dojin, p. 214-245) and chemical calculation programs such as Gaussian.

The polymer of the present invention has a weight average molecular weight (Mw) preferably in a range of 1000 to 10000000, more preferably in a range of 1000 to 1000000, and most preferably in a range of 1000 to 100000. Accordingly, the polymer of the present invention is a novel cyclic structure-containing polymer.

A molecular weight distribution of the polymer of the present invention is preferably in a range of 1.0 to 8.0, more preferably in a range of 1.0 to 6.0, and most preferably in a range of 1.0 to 4.0.

<2. Method For Producing Polymer>

According to a method for producing a polymer of the present invention, the polymer of the present invention is produced by polymerization of a compound represented by the following formula (5):

[Chem. 7]

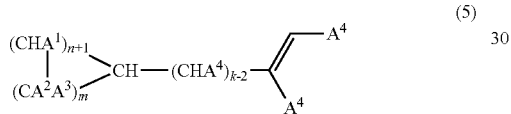

(5)

wherein: each of $A^1$, $A^2$, $A^3$, and $A^4$ independently represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; each of $A^1$, $A^2$, $A^3$, and $A^4$ is independently any of these groups at different carbons to which the each of $A^1$, $A^2$, $A^3$, and $A^4$ is bonded, and $A^1$, $A^2$, $A^3$, and $A^4$ may be bonded to each other; and each of m, n, and k is independently an integer in a range of 2 to 20.

According to the method for producing the polymer of the present invention, it is possible to produce a polymer including the repeating unit represented by the above formula (1). Further, it is possible to suitably produce a polymer in which substantially 100 mol % of repeating units are trans-configuration repeating units in a case where a total amount of repeating units in the polymer is 100 mol.

[2-1. Monomer]

A monomer in the present invention is a compound represented by the above formula (5). In the above formula (5), each of $A^1$, $A^2$, $A^3$, and $A^4$ should independently be a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group. The alkyl group, the aralkyl group, the aryl group, the silyl group, the siloxy group, the alkoxy group, the aralkyloxy group, the aryloxy group, the amino group, the amide group, the imide group, or the hydrocarbon thio group may have a substituent. Further, each of m, n, and k should be independently an integer in a range of 2 to 20.

A preferable element or a preferable substituent as the hydrogen atom, the halogen atom, the alkyl group, the aralkyl group, the aryl group, the silyl group, the siloxy group, the alkoxy group, the aralkyloxy group, the aryloxy group, the amino group, the amide group, the imide group, or the hydrocarbon thio group of each of $A^1$, $A^2$, $A^3$, and $A^4$ in the above formula (5) is identical to a preferable element or a preferable substituent as the hydrogen atom, the halogen atom, the alkyl group, the aralkyl group, the aryl group, the silyl group, the siloxy group, the alkoxy group, the aralkyloxy group, the aryloxy group, the amino group, the amide group, the imide group, or the hydrocarbon thio group in each of $A^1$, $A^2$, $A^3$, and $A^4$ in the above formula (1).

Further, the substituent that each of the alkyl group, the aralkyl group, the aryl group, the silyl group, the siloxy group, the alkoxy group, the aralkyloxy group, the aryloxy group, the amino group, the amide group, the imide group, or the hydrocarbon thio group in each of $A^1$, $A^2$, $A^3$, and $A^4$ in the above formula (5) may have is identical to the substituent that each of the alkyl group, the aralkyl group, the aryl group, the silyl group, the siloxy group, the alkoxy group, the aralkyloxy group, the aryloxy group, the amino group, the amide group, the imide group, or the hydrocarbon thio group in each of $A^1$, $A^2$, $A^3$, and $A^4$ in the above formula (1) may have.

As the monomer, a compound represented by the following formula (6) may be used:

[Chem. 8]

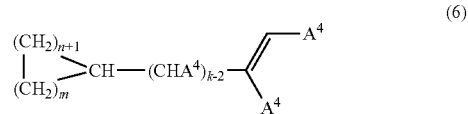

(6)

wherein: $A^4$ should be a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; and each of m, n, and k should be independently an integer in a range of 2 to 20.

According to the method for producing the polymer of the present invention, it is possible to produce a polymer including a repeating unit represented by the above formula (3), by polymerization of the compound represented by the following formula (6).

It is preferable to use, as a monomer, at least one kind selected from a group including α-alkenylcyclohexane, α-alkenylcycloheptane, α-alkenylcyclooctane, and α-alkenylcyclodecane (Note that the number of carbon atoms of an α-alkenyl group is an integer in a range of 2 to 20.). It is more preferable to use α-alkenylcyclohexane. Examples of the α-alkenylcyclohexane used as the monomer encompass vinylcyclohexane, allylcyclohexane, 4-cyclohexyl-1-butene, 4-cyclohexyl-1-hexene, 4-cyclohexyl-1-octene, and 4-cyclohexyl-1-decene. Examples of the α-alkenylcycloheptane used as the monomer encompass vinylcycloheptane, allylcycloheptane, 4-cycloheptyl-1-butene, 4-cycloheptyl-1-hexene, 4-cycloheptyl-1-octene, and 4-cycloheptyl-1-decene. Examples of the α-alkenylcyclooctane used as the monomer encompass vinylcyclooctane, allylcyclooctane, 4-cyclooctyl-1-butene, 4-cyclooctyl-1-hexene, 4-cyclooctyl-1-octene, and 4-cyclooctyl-1-decene. Examples of the α-alkenylcyclodecane used as the monomer encompass vinylcyclodecane, allylcyclodecane, 4-cyclodecyl-1-butene, 4-cyclodecyl-1-hexene, 4-cyclodecyl-1-octene, and 4-cyclodecyl-1-decene.

According to the method for producing a polymer of the present invention, it is possible to produce a polymer including a repeating unit represented by the above formula (4), by polymerization of α-alkenylcyclohexane.

[2-2. Catalyst]

In the method for producing the polymer of the present invention, a catalyst used for polymerization of the monomers should be a catalyst prepared by putting a boron compound and a transition metal compound in contact with each other.

(Transition Metal Compound)

The transition metal compound in the present invention should be a transition metal compound represented by the following formula (7):

[Chem. 9]

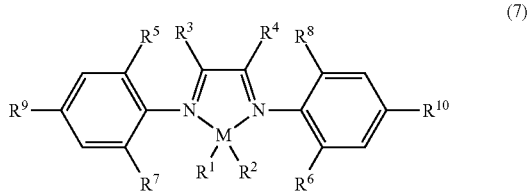

(7)

wherein: M represents an iron atom, a cobalt atom, a nickel atom, a palladium atom, or a copper atom; each of $R^1$ and $R^2$ independently represents a hydrogen atom, a halogen atom, an alkyl group, an aralkyl group, an aryl group, an alkoxy group, an aralkyloxy group, or an aryloxy group; each of $R^3$ to $R^{10}$ independently represents a hydrogen atom, a halogen atom, an alkyl group, an aralkyl group, an aryl group, an alkoxy group, an aralkyloxy group, an aryloxy group, an acyl group, an alkoxycarbonyl group, an aralkyloxycarbonyl group, an aryloxycarbonyl group, an amino group, an amide group, or a hydrocarbon thio group; and $R^3$ and $R^4$ may be bonded to each other.

In the above formula (7), M should be an iron atom, a cobalt atom, a nickel atom, a palladium atom, or a copper atom. Among these, the palladium atom is particularly preferable as the metal atom.

In the above formula (7), each of $R^1$ and $R^2$ should independently be a hydrogen atom, a halogen atom, an alkyl group, an aralkyl group, an aryl group, an alkoxy group, an aralkyloxy group, or an aryloxy group, and $R^1$ and $R^2$ may be bonded to each other so as to form a ring. Each of the alkyl group, the aralkyl group, the aryl group, the alkoxy group, the aralkyloxy group, or the aryloxy group may have a substituent.

Examples of the halogen atom in each of $R^1$ and $R^2$ in the above formula (7) encompass a fluorine atom, a chlorine atom, a bromine atom, and an iodine atom. Among these, the chlorine atom or the bromine atom is particularly preferable as the halogen atom.

Examples of the alkyl group in each of $R^1$ and $R^2$ of the above formula (7) encompass a straight chain alkyl group, a branched alkyl group, and a cyclic alkyl group. Examples of the straight chain alkyl group encompass a methyl group, an ethyl group, and an n-butyl group. Examples of the branched alkyl group encompass an isopropyl group, an isobutyl group, a tert-butyl group, and a neopentyl group. Examples of the cyclic alkyl group encompass a cyclohexyl group and a cyclooctyl group. The alkyl group may have a substituent. Examples of the substituent encompass a halogen atom, a hydrocarbon oxy group, a nitro group, a sulfonate group, and a cyano group. In particular, the alkyl group is preferably an alkyl group having 1 to 20 carbon atoms, more preferably a straight chain unsubstituted alkyl group having 1 to 12 carbon atoms, and still more preferably a methyl group.

Examples of the aralkyl group in each of $R^1$ and $R^2$ of the above formula (7) encompass a benzyl group and a phenethyl group. This aralkyl group may have a substituent. Examples of the substituent encompass a halogen atom, a hydrocarbon oxy group, a nitro group, a sulfonate group, a silyl group, and a cyano group. In particular, the aralkyl group is preferably an aralkyl group having 7 to 12 carbon atoms, more preferably an unsubstituted aralkyl group having 7 to 12 carbon atoms, and still more preferably a benzyl group.

Examples of the aryl group in each of $R^1$ and $R^2$ of the above formula (7) encompass a phenyl group, a naphthyl group, a 4-tolyl group, a mesityl group, and a 4-phenylphenyl group. This aryl group may have a substituent. Examples of the substituent encompass a halogen atom, a hydrocarbon oxy group, a nitro group, a sulfonate group, a silyl group, and a cyano group. In particular, the aryl group is preferably an aryl group having 6 to 20 carbon atoms, more preferably an aryl group having 6 to 12 carbon atoms, and the still more preferably a phenyl group, a 4-tolyl group, or a mesityl group.

Examples of the alkoxy group in each of $R^1$ and $R^2$ of the above formula (7) encompass a methoxy group, an ethoxy group, an n-propoxy group, an isopropoxy group, an n-butoxy group, a sec-butoxy group, a tert-butoxy group, an n-pentyloxy group, a neopentyloxy group, an n-hexyloxy group, an n-octyloxy group, an n-dodecyloxy group, an n-pentadecyloxy group, and an n-eicosyloxy group.

Examples of the aralkyloxy group in each of $R^1$ and $R^2$ of the above formula (7) encompass a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl)methoxy group, an (ethylphenyl)methoxy group, an (n-propylphenyl)methoxy group, an (isopropylphenyl)methoxy group, an (n-butylphenyl)methoxy group, a (sec-butylphenyl)methoxy group, a (tert-butylphenyl)methoxy group, an (n-hexylphenyl)methoxy group, an (n-octylphenyl)methoxy group, an (n-decylphenyl)methoxy group, a naphthylmethoxy group, and an anthracenylmethoxy group. The aralkyloxy group may have a substituent. Examples of the substituent encompass a halogen atom, a hydrocarbon oxy group, a nitro group, a sulfonate group, a silyl group, and a cyano group. In particular, the aralkyloxy group is preferably an aralkyloxy group having 7 to 20 carbon atoms, and more preferably a benzyloxy group.

Examples of the aryloxy group in each of $R^1$ and $R^2$ of the above formula (7) encompass a phenoxy group, a 2-methylphenoxy group, a 3-methylphenoxy group, a 4-methylhenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5- trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, an n-propylphenoxy group, an isopropylphenoxy group, an n-butylphenoxy group, a sec-butylphenoxy group, a tert-butylphenoxy group, an n-hexylphenoxy group, an n-octylphenoxy group, an n-decylphenoxy group, a naphthoxy group, and an anthracenoxy group. The aryloxy group may have a substituent. Examples of the substituent encompass a halogen atom, a hydrocarbon oxy group, a nitro group, a sulfonate group, a silyl group, and a cyano group. In particular, the aryloxy group is preferably an aryloxy group having 6 to 20 carbon atoms.

In the above formula (7), each of $R^1$ and $R^2$ is preferably a hydrogen atom, a halogen atom, an alkyl group, or an aryl group. Each of $R^1$ and $R^2$ is more preferably a hydrogen atom, a halogen atom, or a straight chain unsubstituted alkyl group having 1 to 12 carbon atoms, and particularly preferably a chlorine atom or a methyl group.

In the above formula (7), each of $R^3$ to $R^{10}$ should independently be a hydrogen atom, a halogen atom, an alkyl group, an aralkyl group, an aryl group, an alkoxy group, an aralkyloxy group, an aryloxy group, an acyl group, an alkoxycarbonyl group, an aralkyloxycarbonyl group, an aryloxycarbonyl group, an amino group, an amide group, or a hydrocarbon thio group. Further, the alkyl group, the aralkyl group, the aryl group, the alkoxy group, the aralkyloxy group, the aryloxy group, then acyl group, the alkoxycarbonyl group, the aralkyloxycarbonyl group, the aryloxycarbonyl group, the amino group, the amide group, or the hydrocarbon thio group may have a substituent.

Examples of the halogen atom, the alkyl group, the aralkyl group, the aryl group, the alkoxy group, the aralkyloxy group, and the aryloxy group in each of $R^3$ to $R^{10}$ in the above formula (7) are identical to the examples of the halogen atom, the alkyl group, the aralkyl group, the aryl group, the alkoxy group, the aralkyloxy group, and the aryloxy group in each of $R^1$ and $R^2$ described above.

Examples of the acyl group in each of $R^3$ to $R^{10}$ of the above formula (7) encompass a formyl group, an acetyl group, a propionyl group, a butyryl group, an isobutyryl group, an isovaleryl group, a pivaloyl group, a heptanoyl group, and a decanoyl group. The acyl group may have a substituent. Examples of the substituent encompass a halogen atom, a hydrocarbon oxy group, a nitro group, a sulfonate group, a silyl group, and a cyano group.

Examples of the alkoxycarbonyl group in each of $R^3$ to $R^{10}$ of the above formula (7) encompass a methoxycarbonyl group, an ethoxycarbonyl group, a butoxycarbonyl group, an octyloxycarbonyl group, and a decyloxycarbonyl group. The alkoxycarbonyl group may have a substituent. Examples of the substituent encompass a halogen atom, a hydrocarbon oxy group, a nitro group, a sulfonate group, a silyl group, and a cyano group.

Examples of the aralkyloxycarbonyl group in each of $R^3$ to $R^{10}$ of the above formula (7) encompass a 2-phenylethyloxycarbonyl group, a benzyloxycarbonyl group, a 1-phenylethyloxycarbonyl group, a 3-phenylpropyloxycarbonyl group, and a 4-phenylbutyloxycarbonyl group. The aralkyloxycarbonyl group may have a substituent. Examples of the substituent encompass a halogen atom, a hydrocarbon oxy group, a nitro group, a sulfonate group, a silyl group, and a cyano group.

Examples of the aryloxycarbonyl group in each of $R^3$ to $R^{10}$ of the above formula (7) encompass a phenyloxycarbonyl group, a 2-methylphenyloxycarbonyl group, a 4-methoxyphenyloxycarbonyl group, a 1-naphthyloxycarbonyl group, a 2-methyl-1-naphthyloxycarbonyl group, a 3-methyl-1-naphthyloxycarbonyl group, a 4-methyl-1-naphthyloxycarbonyl group, a 6-methyl-1-naphthyloxycarbonyl group, a 2-naphthyloxycarbonyl group, a 1-methyl-2-naphthyloxycarbonyl group, a 3-methyl-2-naphthyloxycarbonyl group, a 4-methyl-2-naphthyloxycarbonyl group, and a 6-methyl-2-naphthyloxycarbonyl group. The aryloxy carbonyl group may have a substituent. Examples of the substituent encompass a halogen atom, a hydrocarbon oxy group, a nitro group, a sulfonate group, a silyl group, and a cyano group.

Examples of the amino group in each of $R^3$ to $R^{10}$ of the above formula (7) may have a substituent. Examples of a substituted amino group encompass a straight chain alkylamino group, a branched alkylamino group, and a cyclic alkylamino group. Examples of the straight chain alkylamino group encompass an N-methylamino group, an N-ethylamino group, an N,N-n-butylamino group, an N,N-dimethylamino group, an N,N-diethylamino group, and an N,N-di-n-butylamino group. Examples of the branched alkylamino group encompass an N,N-diisopropylamino group, an N,N-diisobutylamino group, an N,N-di-tert-butylamino group, and an N,N-dineopentylamino group. Examples of the cyclic alkylamino group encompass an N,N-dicyclohexylamino group and an N,N-dicyclooctylamino group. The substituted amino group may additionally have another substituent. Examples of the substituent encompass a halogen atom, a hydrocarbon oxy group, a nitro group, a sulfonate group, and a cyano group.

Examples of the amide group in each of $R^3$ to $R^{10}$ of the above formula (7) may have a substituent. Examples of a substituted amide group encompass an ethanamide group, an N-n-butylethanamide group, an N-methylethanamide group, an N-ethylethanamide group, an N-n-butylhexanamide group, an isopropanamide group, an isobutanamide group, a tert-butanamide group, a neopentanamide group, a cyclohexanamide group, and a cyclooctanamide group. The substituted amide group may additionally have another substituent. Examples of the substituent encompass a halogen atom, a hydrocarbon oxy group, a nitro group, a sulfonate group, and a cyano group.

Examples of the hydrocarbon thio group in each of $R^3$ to $R^{10}$ of the above formula (7) encompass an alkylthio group, an arylthio group, and an aralkylthio group. Examples of the alkylthio group encompass a methylthio group, an ethylthio group, an isopropylthio group, and a tert-butylthio group. Examples of the arylthio group encompass a phenylthio group and a naphthylthio group. Examples of the aralkylthio group encompass a benzylthio group, and a 9-fluorenylmethylthio group. The hydrocarbon thio group may have a substituent. Examples of the substituent encompass a halogen atom, a hydrocarbon oxy group, a nitro group, a sulfonate group, and a cyano group.

Each of $R^3$ and $R^4$ of the above formula (7) may independently be a hydrocarbon group having 1 to 20 carbon atoms. This hydrocarbon group may be an alkyl group or an aryl group. Further, the hydrocarbon group may have a substituent. Examples of the substituent encompass a halogen atom, a hydrocarbon oxy group, a nitro group, a sulfonyl group, and a silyl group. Examples of the alkyl group encompass a straight chain alkyl group, a branched alkyl group, and a cyclic alkyl group. Examples of the straight chain alkyl group encompass a methyl group, an ethyl group, and an n-butyl group. Examples of the branched alkyl group encompass an isopropyl group, an isobutyl group, a tert-butyl group, and a neopentyl group. Examples of the cyclic alkyl group encompass a cyclohexyl group and a cyclooctyl group. Among them, the alkyl group is preferably an alkyl group having 1 to 20 carbon atoms, more preferably a straight chain alkyl group having 1 to 12 carbon atoms, and still more preferably a methyl group or an ethyl group. Examples of the aryl group encompass a phenyl group, a naphthyl group, a 4-tolyl group, and a mesityl group. Among these, the aryl group is preferably an aryl group having 6 to 20 carbon atoms, more preferably an aryl group having 6 to 12 carbon atoms, and still more preferably a phenyl group or a mesityl group.

$R^3$ and $R^4$ in the above formula (7) may be bonded to each other so as to form a ring with the carbon atoms bonded to $R^3$ and $R^4$, respectively. Examples of the ring thus formed encompass an aliphatic ring and an aromatic ring. Each of these rings may have a substituent. Examples of a divalent group formed by the bonding of $R^3$ and $R^4$ in the aliphatic ring encompass a 1,2-ethylene group, an ethene-1,2-diyl group, a cyclohexane-1,2-diyl group, a norbornane-1,2-diyl group, a butane-2,3-diyl group, a 2,3-dimethylbutane-2,3-diyl group, and a pentane-2,4-diyl group. Examples of a divalent group formed by the bonding of $R^3$ and $R^4$ in the aromatic ring encompass a 1,2-phenylene group, and a naphthalene-1,8-diyl group. The divalent group formed by the bonding of $R^3$ and $R^4$ in the aromatic ring is preferably a naphthalene-1,8-diyl group.

Each of $R^5$ and $R^8$ in the above formula (7) is preferably an alkyl group, more preferably an alkyl group having 1 to 12 carbon atoms, and still more preferably a methyl group, an ethyl group, an n-propyl group, an isopropyl group, an n-butyl group, an isobutyl group, or a tert-butyl group.

Each of $R^6$ and $R^7$ in the above formula (7) may independently be an aryl group having 7 to 20 carbon atoms. Examples of the aryl group encompass a 2-methylphenyl group, a 3-methylphenyl group, a 4-methylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a naphthyl group, a 2-methyl-1-naphthyl group, a 3-methyl-1-naphthyl group, a 4-methyl-1-naphthyl group, a 2,3-dimethyl-1-naphthyl group, a 2,4-dimethyl-1-naphthyl group, a 2,5-dimethyl-1-naphthyl group, a 2,6-dimethyl-1-naphthyl group, a 3,4-dimethyl-1-naphthyl group, a 3,5-dimethyl-1-naphthyl group, a 3,6-dimethyl-1-naphthyl group, an anthracenyl group, a 2-methyl-1-anthracenyl group, a 3-methyl-O-anthracenyl group, a 4-methyl-10-anthracenyl group, a 2,3-dimethyl-10-anthracenyl group, a 2,4-dimethyl-10-anthracenyl group, a 2,5-dimethyl-1-10-anthracenyl group, a 2,6-dimethyl-10-anthracenyl group, a 3,4-dimethyl-10-anthracenyl group, a 3,5-dimethyl-10-anthracenyl group, a 3,6-dimethyl-10-anthracenyl group, and a 2-methyl-10-anthracenyl group. Among these, the aryl group is preferably a substituted phenyl group, a naphthyl group, or an anthracenyl group, and more preferably a 2-methyl-phenyl group or a naphthyl group.

In the above formula (7), each of $R^9$ and $R^{19}$ is preferably a hydrogen atom or an alkyl group, more preferably a hydrogen atom or an alkyl group having 1 to 12 carbon atoms, and still more preferably a methyl group, an ethyl group, an n-propyl group, an isopropyl group, an n-butyl group, or an isobutyl group.

Further, the transition metal compound may be a transition metal compound represented by the following formula (8):

[Chem. 10]

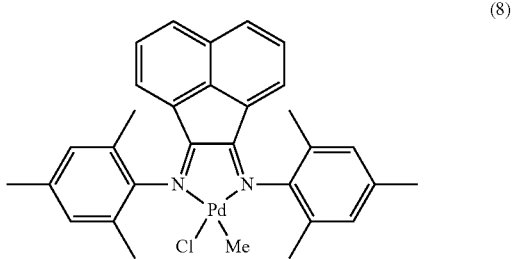

(8)

Alternatively, the transition metal compound may be a transition metal compound represented by the following formula (9):

[Chem. 11]

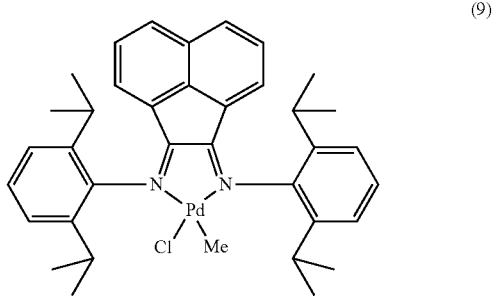

(9)

(Boron Compound)

A boron compound in the present invention may be a well-known compound. Examples of the boron compound encompass the following compounds and a combination of one or more kinds of the following compounds.

(X1) Boron compound represented by the formula: $BQ^1Q^2Q^3$;

(X2) Boron compound represented by the formula: $G^+(BQ^1Q^2Q^3Q^4)^-$; and (X3) Boron compound represented by the formula: $(J-H)^+(BQ^1Q^2Q^3Q^4)^-$ Note that: in the above formulae (X1) to (X3), B represents a boron atom that has a trivalent valence state; each of $Q^1$ to $Q^4$ independently represents a halogen atom, a hydrocarbon group, a halogenated hydrocarbon group, a silyl group, a siloxy group, an alkoxy group, an amino group, an amide group, or an imide group; $G^+$ represents an inorganic or organic cation; J represents a neutral Lewis base; and $(J-H)^+$ represents a Broensted acid.

Each of $Q^1$ to $Q^4$ in the above formulae (X1) to (X3) is preferably a halogen atom, a hydrocarbon group having 1 to 20 carbon atoms, a halogenated hydrocarbon group having 1 to 20 carbon atoms, a silyl group having 1 to 20 carbon atoms, a siloxy group, an amino group substituted by a hydrocarbon group having 2 to 20 carbon atoms, an amide group substituted by a hydrocarbon group having 2 to 20 carbon atoms, or an imide group substituted by a hydrocarbon group having 2 to 20 carbon atoms. Each of $Q^1$ to $Q^4$ is more preferably a halogen atom, a hydrocarbon group having 1 to 20 carbon atoms, or a halogenated hydrocarbon group having 1 to 20 carbon atoms. Each of $Q^1$ to $Q^4$ is still more preferably a fluorinated hydrocarbon group containing at least one fluorine atom which fluorinated hydrocarbon group has 1 to 20 carbon atoms. It is particularly preferable that each of $Q^1$ to $Q^4$ be a fluorinated aryl group containing at least one fluorine atom which fluorinated aryl group has 6 to 20 carbon atoms.

Examples of the boron compound represented by the above formula (X1) encompass tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, and phenylbis(pentafluorophenyl)borane.

Examples of $G^+$ that is an inorganic cation in the boron compound represented by the above formula (X2) encompass a ferrocenium cation, an alkyl-substituted ferrocenium cation, and a silver cation. Examples of $G^+$ that is an organic cation is a triphenylmethyl cation.

Examples of $(BQ^1Q^2Q^3Q^4)$ in the above formula (X2) encompass tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, phenyltris(pentafluorophenyl)borate, and tetrakis[3,5-bis(trifluoromethyl)phenyl]borate.

Examples of the boron compound represented by the above formula (X2) encompass lithiumtetrakis[3,5-bis(trifluoromethyl)phenyl]borate, sodiumtetrakis[3,5-bis(trifluoromethyl)phenyl]borate, potassiumtetrakis[3,5-bis(trifluoromethyl)phenyl]borate, silvertetrakis(pentafluorophenyl)borate, ferroceniumtetrakis(pentafluorophenyl)borate, 1,1'-dimethylferroceniumtetrakis(pentafluorophenyl)borate, tetrabutylphosphoniumtetrakis(pentafluorophenyl)borate, tetraphenylphosphoniumtetrakis(pentafluorophenyl)borate, tetramethylammoniumtetrakis(pentafluorophenyl)borate, trimethylsulfoniumtetrakis(pentafluorophenyl)borate, diphenyliodoniumtetrakis(pentafluorophenyl)borate, triphenylcarbeniumtetrakis(pentafluorophenyl)borate, and triphenylcarbeniumtetrakis[3,5-bis(trifluoromethyl)phenyl]borate. Among them, the most preferable boron compound represented by the above formula (X2) is sodiumtetrakis[3,5-bis(trifluoromethyl)phenyl]borate.

Examples of $(J-H)^+$ in the above formula (X3) encompass trialkyl-substituted ammonium, N,N-dialkylanilinium, dialkylammonium and triarylphosphonium. The same substances as the examples of $(J-H)^+$ can be provided as examples of $(BQ^1Q^2Q^3Q^4)$.

Examples of the boron compound represented by the above formula (X3) encompass triethylammoniumtetrakis(pentafluorophenyl)borate, tripropylammoniumtetrakis(pentafluorophenyl)borate, tri(n-butyl)ammoniumtetrakis(pentafluorophenyl)borate, tri(n-butyl)ammoniumtetrakis[3,5-bis(trifluoromethyl)phenyl]borate, N,N-dimethylaniliniumtetrakis(pentafluorophenyl)borate, N,N-diethylaniliniumtetrakis(pentafluorophenyl)borate, N,N-dimethyl-2,4,6-trimethylaniliniumtetrakis(pentafluorophenyl)borate, N,N-dimethylaniliniumtetrakis[3,5-bis(trifluoromethyl)phenyl]borate, diisopropylammoniumtetrakis(pentafluorophenyl)borate, dicyclohexylammoniumtetrakis(pentafluorophenyl)borate, triphenylphosphoniumtetrakis(pentafluorophenyl)borate, tri(methylphenyl)phosphoniumtetrakis(pentafluorophenyl)borate, and tri(dimethylphenyl)phosphoniumtetrakis(pentafluorophenyl)borate.

The boron compound in the present invention is preferably the boron compound represented by the above formula (X3). In particular, sodiumtetrakis[3,5-bis(trifluoromethyl)phenyl]borate is preferable as the boron compound.

(Method for Producing Catalyst)

A method for producing the catalyst in the present invention can be a method according to which at least one kind of boron compound and the above described transition metal compound are brought in contact with each other. The method to cause the contact may be, for example, by simple mixing or stirring as appropriate.

Each of the transition metal compound and the boron compound in the present invention can be used in the form of solutions. Examples of solvents of the solutions encompass methylene chloride, chloroform, toluene, pentane, hexane, and heptane. In particular, methylene chloride, chloroform, or toluene is preferable as the solvents.

A concentration of a transition metal compound solution is in general in a range of 0.01 µmol/L to 500 µmol/L, preferably in a range of 0.05 µmol/L to 100 µmol/L, and still more preferably 0.05 µmol/L to 50 µmol/L. A concentration of a boron compound solution is in general in a range of 0.01 µmol/L to 500 µmol/L, preferably in a range of 0.05 µmol/L to 200 µmol/L, and still more preferably 0.05 µmol/L to 100 µmol/L. By arranging the concentration of the transition metal compound solution to be 0.01 µmol/L or more and the concentration of the boron compound solution to be 0.01 µmol/L or more, an amount of solvent to be used can be reduced. This is advantageous in view of cost. Further, by arranging the concentration of the transition metal compound solution to be 500 µmol/L or less and the concentration of the boron compound solution to be 500 mol/L or less, these compounds can be sufficiently dissolved. This makes it possible to prevent precipitation of the compounds.

Note that the catalyst of the present invention may be combined with a support made of a particulate substance of an inorganic compound or an organic compound. Examples of the inorganic compound encompass silica gel and alumina. Further, an example of the organic compound is a styrene polymer.

[2-3. Polymerization Method]

Examples of a polymerization method in the present invention encompass a batch type or continuous type gas phase polymerization method, bulk polymerization method, and solution polymerization or slurry polymerization method with the use of a suitable polymerization solvent. The polymerization solvent may be any solvent as long as the solvent does not deactivate a polymerization catalyst. Examples of the polymerization solvent encompass hydrocarbon solvents such as benzene, toluene, pentane, hexane, heptane, and cyclohexane, and halogenated solvents such as methylene chloride and chloroform.

A polymerization temperature in the present invention is preferably in a range of −100° C. to 250° C., and more preferably in a range of −50° C. to 200° C. In a case where the polymerization temperature is −100° C. or higher, the solvent shows sufficient activity for a polymerization reaction. In a case where the polymerization temperature is 250° C. or less, it is possible to obtain a polymer that has a higher molecular weight and/or to prevent the occurrence of a side reaction such as an isomerization reaction.

For adjusting a molecular weight of a polymer to be obtained, a chain transfer agent may be used. One example of the chain transfer agent is hydrogen.

A polymerization time in the present invention is preferably in a range of 1 minute to 72 hours. In a case where the polymerization time is 1 minute or more, a sufficient yield of the polymer can be obtained. Further, it is advantageous to set the polymerization time to 72 hours or less because the polymerization time set to 72 hours or less makes it possible to suppress production cost of the polymerization.

The following shows Examples and explains the embodiment of the present invention more in detail.

EXAMPLES

The following explains conditions in measurement in Examples, regarding the items below.

(Steric Positional Relationship)

Regarding a steric positional relationship between a main chain and a ring in the polymer, how much proportion the polymers each having a trans configuration account for in the polymer was found out by use of $^{13}$C-NMR under the following conditions:

Examples 1 to 7

Measured spectrum: $^{13}$C-NMR spectrum
Machine Type: LA-500 manufactured by JEOL Ltd.
Solvent for Measurement: 1,1,2,2-tetrachloroethane-d$_2$
Temperature for Measurement: 130° C.
Sample Concentration: 50 mg/0.5 ml
Reference material: 1,1,2,2-tetrachloroethane 74.0 ppm Examples 8 to 12

Measured spectrum: $^{13}$C-NMR spectrum
Machine Type: JNM-AL400 manufactured by JEOL Ltd.
Solvent for Measurement: 1,2-dichlorobenzene-d$_4$
Temperature for Measurement: 135° C.
Sample Concentration: 100 mg/0.4 mL
Reference material: 132.6 ppm (Cl-bonded carbon of 1,2-dichlorobenzene)
Pulse delay: 1.8 seconds
ACQTM: 1.2 seconds
Pulse: 5.8 micro seconds
The number of carbons attached to a specific carbon: DEPT 135°

In a $^{13}$C-NMR spectrum of the polymers, a signal around 38.5 ppm is attributed to tertiary carbons a in the following formula (A);
a signal around 33.6 ppm is attributed to secondary carbons b in the following formula (A);
a signal around 34.8 ppm is attributed to secondary carbons c in the following formula (A);
a signal around 38.1 ppm is attributed to tertiary carbons d in the following formula (B);
a signal around 33.6 ppm is attributed to secondary carbons e in the following formula (B);
a signal around 38.0 ppm is attributed to secondary carbons f in the following formula (B); and
a signal around 24.3 ppm is attributed to secondary carbon g in the following formula (B).

[Chem. 12]

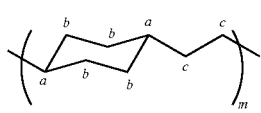

(A)

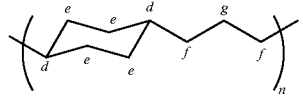

(B)

The above identifications are carried out by spectrum analysis using $^{13}$C-NMR spectral data of trans-1,4-dimethylcyclohexane, cis-1,4-dimethylcyclohexane, trans-1,2-dimethylcyclohexane, cis-1,2-dimethylcyclohexane, and methylcyclohexane obtained from Spectra database system for organic compounds of the National Institute of Advanced Industrial Science and Technology.

[Melting Point, Crystallization Temperature, and Glass Transition Point]

Examples 1 to 7

A melting point and a glass transition point of a substance were measured under the following conditions by Differential Scanning calorimetry (DSC) by use of a type of an apparatus called DSC-6200R manufactured by Seiko Instruments Inc.
Temperature Increase: 25° C. to 300° C. at a rate of 10° C./min, and then keep at 300° C. for 5 minutes
Cooling: 300° C. to −60° C. at a rate of −20° C./min, and then keep at −60° C. for 5 minutes
Measurement: −60° C. to 300° C. at a rate of 10° C./min Examples 8 to 12

A melting point, a crystallization temperature, and a glass transition point of a substance were measured under the following conditions by Differential Scanning calorimetry (DSC) by use of a type of an apparatus called SSC-5200 manufactured by Seiko Instruments Inc. A crystallization temperature was obtained from a DSC cooling curve, and a glass transition point and a melting point were obtained from a DSC second temperature increase curve.
Temperature Increase (first): 20° C. to 300° C. at a rate of 10° C./min, and then keep at 300° C. for 10 minutes
Cooling: 300° C. to −50° C. at a rate of −10° C./min, and then keep at −50° C. for 10 minutes
Temperature Increase (second): −50° C. to 300° C. at a rate of 10° C./min

[Thermal Decomposition Point]

A 5% decomposition point ($T_d^5$) of a substance was measured under the following conditions by Thermogravimetric/Differential Thermal Analyzer (TG/DTA) by use of a type of an apparatus called TG/DTA6200 manufactured by Seiko Instruments Inc.
Temperature Increase: room temperature to 500° C. at a rate of 10° C./min
Atmosphere: Under nitrogen (Number Average Molecular Chain Length and Molecular Weight Distribution)

Gel Permeation Chromatography (GPC) was carried out under the following conditions. A calibration curve was produced by use of standard polystyrene. A molecular weight distribution was evaluated by a ratio (Aw/An) of a weight average molecular chain length (Aw) and a number average molecular chain length (An). The weight average molecular chain length (Aw) is defined as a value obtained by multiplying, by 2.52 Angstrom (the distance of alternate carbons on carbon repeating chain), a result of dividing a weight average molecular weight in polystyrene standard by 104 that is a repeating unit weight of polystyrene. The number average molecular chain length (An) is defined as a value obtained by multiplying, by 2.52 Angstrom (the distance of alternate carbons on carbon repeating chain), a result of dividing a number average molecular weight in polystyrene standard by 104 that is a repeating unit weight of polystyrene.
Machine Type Millipore Waters 150C
Column: TSK-GEL GMH-HT 7.5×600×2
Temperature for Measurement: 152° C.
Carrier: o-dichlorobenzene
Concentration for Measurement: 5 mg/5 ml
Molecular Weight Standard: polystyrene
[Inherent Viscosity]
Inherent viscosity is measured with Ubbelohde viscosimeter at 135° C., by using tetralin as a solvent.

Example 1

Methylene chloride (1.5 mL) was added to a 25 mL Schlenk flask containing chloro(methyl)[N,N'-(1,2-dihydroacenaphthylene-1,2-diylidene)bis(2,6-diisopropylaniline-κN)]palladium (6.6 mg, 0.01 mmol) and sodiumtetrakis{3,5-bis(trifluoromethyl)phenyl}borate (10.6 mg, 0.012 mmol), with 5-minute stirring after the addition. Then, into this Schlenk flask, vinylcyclohexane (0.33 g, 3.0 mmol) was added, with 1-hour stirring at the room temperature after the addition. After polymerization, precipitated polymers were isolated and collected.

As a result, 0.21 g of the polymers were obtained. The polymers obtained were in a solid state at a room temperature and a glass transition point could not be observed at 300° C. and below in DSC measurement. In TG measurement, a 5% decomposition point ($T_d^5$) was 427° C.

Example 2

Polymerization was carried out in the same manner as in Example 1 except that a transition metal complex was changed from 0.01 mmol of chloro(methyl)[N,N'-(1,2-dihydroacenaphthylene-1,2-diylidene)bis(2,6-diisopropylaniline-κN)]palladium to 0.01 mmol of chloro(methyl)[N,N'-(1,2-dihydroacenaphthylene-1,2-diylidene)bis(2,4,6-trimethylaniline-κN)]palladium.

As a result, 0.33 g of polymers were obtained.

Example 3

Polymerization was carried out in the same manner as in Example 1 except that the monomer was changed from vinylcyclohexane (0.33 g, 3.0 mmol) to allylcyclohexane (0.37 g, 3.0 mmol) and the stirring for the polymerization was carried out for 20 minutes at a room temperature.

As a result, 0.36 g of polymers were obtained. The polymers obtained had a number average molecular chain length (An) of 1016 and a molecular weight distribution (Aw/An) of 2.5. The polymers obtained were in a solid state at a room temperature. In DSC measurement, a melting point was 226° C. In TG measurement, a 5% decomposition point ($T_d^5$) was 442° C.

Example 4

Polymerization was carried out in the same manner as in Example 3 except that the transition metal complex was changed from 0.01 mmol of chloro(methyl)[N,N'-(1,2-dihydroacenaphthylene-1,2-diylidene)bis(2,6-diisopropylaniline-κN)]palladium to 0.01 mmol of chloro(methyl)[N,N'-(1,2-dihydroacenaphthylene-1,2-diylidene)bis(2,4,6-trimethylaniline-κN)]palladium.

As a result, 0.32 g of polymers were obtained. The polymers obtained had a number average molecular chain length (An) of 1195 and a molecular weight distribution (Aw/An) of 1.8.

Example 5

Polymerization was carried out in the same manner as in Example 1 except that the monomer was changed from vinylcyclohexane (0.33 g, 3.0 mmol) to 4-cyclohexyl-1-butene (0.42 g, 3.0 mmol) and the stirring for the polymerization was carried out for 20 minutes at a room temperature.

As a result, 0.20 g of polymers were obtained. In DSC measurement, a melting point of the polymers obtained was 195° C.

Example 6

Polymerization was carried out in the same manner as in Example 5 except that a transition metal complex was changed from 0.01 mmol of chloro(methyl)[N,N'-(1,2-dihydroacenaphthylene-1,2-diylidene)bis(2,6-diisopropylaniline-κN)]palladium to 0.01 mmol of chloro(methyl)[N,N'-(1,2-dihydroacenaphthylene-1,2-diylidene)bis(2,4,6-trimethylaniline-κN)]palladium.

As a result, 0.26 g of polymers were obtained. The polymers obtained had a number average molecular chain length (An) of 1095 and a molecular weight distribution (Aw/An) of 2.1.

Example 7

Polymerization was carried out in the same manner as in Example 1 except that: an amount of chloro(methyl)[N,N'-(1,2-dihydroacenaphthylene-1,2-diylidene)bis(2,6-diisopropylaniline-κN)]palladium was changed to 0.012 mmol; an amount of sodiumtetrakis{3,5-bis(trifluoromethyl)phenyl}borate was changed to 0.020 mmol; as monomers, vinylcyclohexane (1.102 g, 10.0 mmol) and allylcyclohexane (1.242 g, 10.0 mmol) were used; and a reaction time was changed to 3 hours. As a result, 1.12 g of polymers were obtained.

$^{13}$C-NMR analysis of the polymers obtained in Examples 1 to 7 confirmed two signals due to cyclohexyl ring around 33 to 40 ppm. Each polymer was identified as the polymer containing a ring structure of 1,4-trans configuration in comparison with low molecular weight model compounds.

Example 8

Industrial hexane (175 mL) and allylcyclohexane (30.7 mL) were added to a 400 mL stainless steel vessel in which the air was replaced by dry nitrogen gas, and then were heated to 35° C. A solution of chloro(methyl)[N,N'-(1,2-dihydroacenaphthylene-1,2-diylidene)bis(2,6-diisopropylaniline-κN)]palladium (32.9 mg, 0.05 mmol) dissolved into 1,2-dichloroethane (3.3 g) and a solution of sodium tetrakis{3,5-bis(trifluoromethyl)phenyl}borate (53 mg, 0.06 mmol) dissolved into 1,2-dichloroethane (2.7 g) were stirred in a flask for two minutes and added to the vessel. The temperature of the stainless steel vessel was kept at 35° C. and the mixed solution in the vessel was stirred for 180 minutes. Then, acetonitrile (4 mL) was added to the vessel as a deactivation reagent and the mixed solution in the vessel was stirred. The solution in the vessel was added into acetone (500 mL). The precipitated polymers were isolated by filtration and dried under vacuum at 120° C. As a result, 9.6 g of polymers were obtained.

In DSC measurement, the following was found about the polymers obtained: a melting point was 212° C.; a crystallization temperature was 180° C.; and a glass transition point was 56° C.; a number average molecular chain length (An) was 4140; and a molecular weight distribution (Aw/An) was 1.6.

From $^{13}$C-NMR and DEPT spectroscopy, a signal of tertiary carbon in 1,4-transcyclohexenyl structure was observed at 38.1 ppm and a signal of secondary carbon in 1,4-transcyclohexenyl structure was observed at 33.6 ppm. Furthermore, signals due to secondary carbons were observed at 38.0 and 24.3 ppm.

A ratio of an area of the signal at 38.1 ppm due to tertiary carbon in 1,4-transcyclohexenyl structure to a total area of the signals due to all the tertiary carbons between 38.1 and 42.2 ppm in the polymers was 91%. Therefore, the ratio of 1,4-transcyclohexenyl structure in the polymers was estimated as 91%.

Example 9

Polymerization was carried out in the same manner as in Example 8 except that the amount of industrial hexane was changed to 147 mL and vinylcyclohexane (27.2 mL) was added into the stainless steel vessel. As a result, 9.8 g of polymers were obtained.

The following was found about the polymers obtained: a melting point was 230° C.; a crystallization temperature was 203° C.; a glass transition point was 61° C.; a number average molecular chain length (An) was 2580; a molecular weight distribution (Aw/An) was 1.6; and an inherent viscosity was 1.46 dL/g.

From $^{13}$C-NMR and DEPT spectroscopy, signals of tertiary carbon in 1,4-transcyclohexenyl structure were observed at 38.5 and 38.1 ppm and a signal of secondary carbon in 1,4-transcyclohexenyl structure was observed at 33.6 ppm. Furthermore, signals due to secondary carbons were observed at 38.0, 34.8, and 24.3 ppm.

The ratio of the area of the signals between 38.1 and 38.5 ppm due to tertiary carbon in 1,4-transcyclohexenyl structure to the total area of the signals due to all the tertiary carbons between 38.1 and 42.2 ppm in the polymers was 94%. Therefore, the ratio of 1,4-transcyclohexenyl structure in the polymers was estimated as 94%.

Furthermore, a content of vinylcyclohexane was calculated as 10 mol % from the area of the signal at 34.8 ppm of the polymer due to secondary carbon of vinylcyclohexane unit (carbon c in the formula (A)) and the area of signal at 24.3 ppm of the polymer due to secondary carbon of allylcyclohexane unit (carbon g in the formula (B)).

Example 10

Polymerization was carried out in the same manner as in Example 8 except that: the amount of industrial hexane was changed to 149 mL; the amount of allylcyclohexane was changed to 15.3 mL; and vinylcyclohexane (40.7 mL) was added into the stainless steel vessel. As a result, 9.4 g of polymers were obtained.

The following was found about the polymers obtained: a melting point was 263° C.; a crystallization temperature was 248° C.; a glass transition point was 70° C.; a number average molecular chain length (An) was 2870; a molecular weight distribution (Aw/An) was 1.6; and an inherent viscosity was 1.51 dL/g.

From $^{13}$C-NMR and DEPT spectroscopy, signals of tertiary carbon in 1,4-transcyclohexenyl structure were observed at 38.5 and 38.1 ppm and a signal of secondary carbon in 1,4-transcyclohexenyl structure was observed at 33.6 ppm. Furthermore, signals due to secondary carbons were observed at 38.0, 34.8, and 24.3 ppm.

The ratio of the area of the signals between 38.1 and 38.5 ppm due to tertiary carbon in 1,4-transcyclohexenyl structure to the total area of the signals due to all the tertiary carbons between 38.1 and 42.2 ppm in the polymers was 91%. Therefore, the ratio of 1,4-transcyclohexenyl structure in the polymers was estimated as 91%.

Furthermore, the content of vinylcyclohexane was calculated as 31 mol % from the area of the signal at 34.8 ppm of the polymer due to secondary carbon of vinylcyclohexane unit (carbon c in the formula (A)) and the area of the signal at 24.3 ppm of the polymer due to secondary carbon of allylcyclohexane unit (carbon g in the formula (B)).

Example 11

Industrial hexane (175 mL) and allylcyclohexane (30.7 mL) were added to a 400 mL stainless steel vessel in which the air was replaced by dry nitrogen gas, and then were heated to 35° C. A solution of chloro(methyl)[N,N'-(1,2-dihydroacenaphthylene-1,2-diylidene)bis(2,4,6-trimethylaniline-κN)]palladium (28.7 mg, 0.05 mmol) dissolved into 1,2-dichloroethane (3.3 g) and a solution of lithium tetrakis(pentafluorophenyl)borate-ethyl ether complex (59 mg, 0.06 mmol) dissolved into 1,2-dichloroethane (2.7 g) were stirred in a flask for two minutes and added to the stainless steel vessel. The temperature of the vessel was kept at 35° C. and the mixed solution in the vessel was stirred for 180 minutes. Then, acetonitrile (4 mL) was added to the vessel as a deactivation reagent and the mixed solution in the vessel was stirred. The solution in the vessel was added into acetone (500 mL). The precipitated polymers were isolated by filtration and dried under vacuum at 120° C. As a result, 14.5 g of polymers were obtained.

The following was found about the polymers obtained: a melting point was 145.6° C.; a crystallization temperature was 96.4° C.; a glass transition point was 41.9° C.; a number average molecular chain length (An) was 2590; a molecular weight distribution (Aw/An) was 1.9; and an inherent viscosity was 1.31 dL/g.

From $^{13}$C-NMR and DEPT spectroscopy, a signal of tertiary carbon in 1,4-transcyclohexenyl structure was observed at 38.1 ppm and a signal of secondary carbon in 1,4-transcyclohexenyl structure was observed at 33.6 ppm. Furthermore, signals due to secondary carbons were observed at 38.0 and 24.3 ppm.

The ratio of the area of the signal at 38.1 ppm due to tertiary carbon in 1,4-transcyclohexenyl structure to the total area of the signals due to all the tertiary carbons between 38.1 and 42.2 ppm in the polymers was 72%. Therefore, the ratio of 1,4-transcyclohexenyl structure in the polymers was estimated as 72%.

Example 12

Polymerization was carried out in the same manner as in Example 11 except that: the amount of industrial hexane was changed to 176 mL; the amount of allylcyclohexane was changed to 15.3 mL; and vinylcyclohexane (15.3 mL) was added into the stainless steel vessel. As a result, 13.9 g of polymers were obtained.

The following was found about the polymers obtained: a glass transition point was 50.3° C.; a number average molecular chain length (An) was 1250; a molecular weight distribution (Aw/An) was 3.1; and an inherent viscosity was 1.24 dL/g.

From $^{13}$C-NMR and DEPT spectroscopy, signals of tertiary carbon in 1,4-transcyclohexenyl structure were observed at 38.5 and 38.1 ppm and a signal of secondary carbon in 1,4-transcyclohexenyl structure was observed at 33.6 ppm. Furthermore, signals due to secondary carbons were observed at 38.0, 34.8, and 24.3 ppm.

The ratio of the area of the signals between 38.1 and 38.5 ppm due to tertiary carbon in 1,4-transcyclohexenyl structure to the total area of the signals due to all the tertiary carbons between 38.1 and 42.2 ppm in the polymers was 78%. Therefore, the ratio of 1,4-transcyclohexenyl structure in the polymers was estimated as 78%.

Furthermore, the content of vinylcyclohexane was calculated as 19 mol % from the area of the signal at 34.8 ppm of the polymer due to secondary carbon of vinylcyclohexane unit (carbon c in the formula (A)) and the area of signal at 24.3 ppm of the polymer due to secondary carbon of allylcyclohexane unit (carbon g in the formula (B)).

INDUSTRIAL APPLICABILITY

A polymer of the present invention can be applied to, for example, parts of automobiles, parts of domestic electronic products, and optical materials.

The invention claimed is:

1. A polymer comprising a repeating unit represented by a following formula (1):

[Chem. 1]

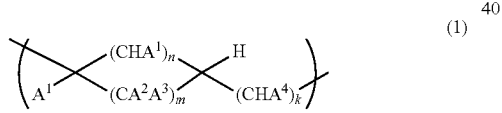
(1)

wherein: each of $A^1$, $A^2$, $A^3$, and $A^4$ independently represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; each of $A^1$, $A^2$, $A^3$, and $A^4$ is independently any of these groups at different carbons to which the each of $A^1$, $A^2$, $A^3$, and $A^4$ is bonded, and $A^1$, $A^2$, $A^3$, and $A^4$ may be bonded to each other; and each of m, n, and k is independently an integer in a range of 2 to 20.

2. The polymer as set forth in claim 1, wherein:
the repeating unit represented by the formula (1) is represented by a following formula (2):

[Chem. 2]

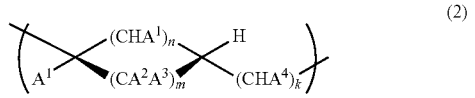
(2)

wherein: each of $A^1$, $A^2$, $A^3$, and $A^4$ independently represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; each of $A^1$, $A^2$, $A^3$, and $A^4$ is independently any of these groups at different carbons to which the each of $A^1$, $A^2$, $A^3$, and $A^4$ is bonded, and $A^1$, $A^2$, $A^3$, and $A^4$ may be bonded to each other; and each of m, n, and k is independently an integer in a range of 2 to 20.

3. The polymer as set forth in claim 1, wherein:
the repeating unit represented by the formula (1) is represented by a following formula (3):

[Chem. 3]

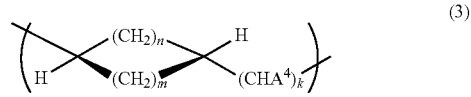
(3)

wherein: $A^4$ represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; and each of m, n, and k is independently an integer in a range of 2 to 20.

4. The polymer as set forth in claim 1, wherein:
the repeating unit represented by the formula (1) is represented by a following formula (4):

[Chem. 4]

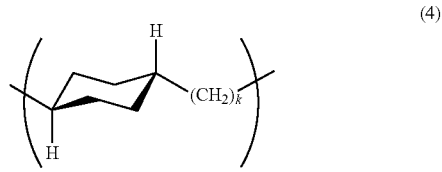
(4)

wherein k is a natural number in a range of 2 to 20.

5. The polymer as set forth in claim 1, wherein:
70 to 100 mol % of a steric structure of the repeating unit represented by the formula (1) has a trans configuration.

6. The polymer as set forth in claim 1, the polymer being a homopolymer.

7. A method for producing a polymer including a repeating unit represented by a following formula (1), the method comprising the step of:
polymerizing a compound represented by a following Formula (5):

[Chem. 5]

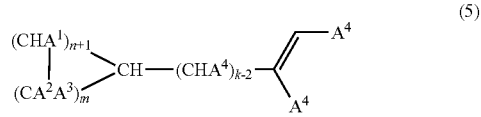
(5)

wherein: each of $A^1$, $A^2$, $A^3$, and $A^4$ independently represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; each of $A^1$, $A^2$, $A^3$, and $A^4$ is independently any of these groups at different carbons to which the each of $A^1$, $A^2$, $A^3$, and $A^4$ is bonded, and $A^1$, $A^2$, $A^3$, and $A^4$ may be bonded to each other; and each of m, n, and k is independently an integer in a range of 2 to 20, the formula (1) being as follows:

[Chem. 6]

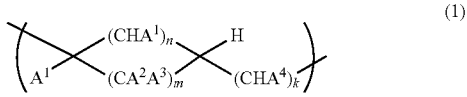

(1)

wherein: each of $A^1$, $A^2$, $A^3$, and $A^4$ independently represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; each of $A^1$, $A^2$, $A^3$, and $A^4$ is independently any of these groups at different carbons to which the each of $A^1$, $A^2$, $A^3$, and $A^4$ is bonded, and $A^1$, $A^2$, $A^3$, and $A^4$ may be bonded to each other; and each of m, n, and k is independently an integer in a range of 2 to 20.

8. The method as set forth in claim 7, wherein:
the repeating unit represented by the formula (1) is represented by a following formula (2):

[Chem. 7]

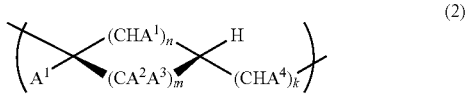

(2)

wherein: each of $A^1$, $A^2$, $A^3$, and $A^4$ independently represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; each of $A^1$, $A^2$, $A^3$, and $A^4$ is independently any of these groups at different carbons to which the each of $A^1$, $A^2$, $A^3$, and $A^4$ is bonded, and $A^1$, $A^2$, $A^3$, and $A^4$ may be bonded to each other; and each of m, n, and k is independently an integer in a range of 2 to 20.

9. The method as set froth in claim 7, wherein:
the compound represented by the formula (5) is represented by a following formula (6):

[Chem. 8]

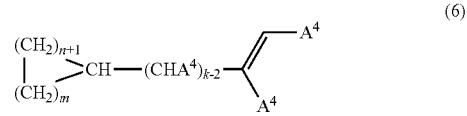

(6)

wherein: $A^4$ represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; and each of m, n, and k is independently an integer in a range of 2 to 20; and the repeating unit represented by the formula (1) is represented by a following formula (3):

[Chem. 9]

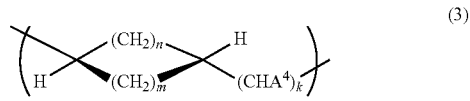

(3)

wherein: $A^4$ represents a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbon thio group; and each of m, n, and k is independently an integer in a range of 2 to 20.

10. The method as set forth in claim 7, wherein:
the compound represented by the formula (5) is α-alkenylcyclohexane, the α-alkenylcyclohexane having an α-alkenyl group having 2 to 20 carbon atoms; and
the repeating unit represented by the formula (1) is represented by a following formula (4):

[Chem. 10]

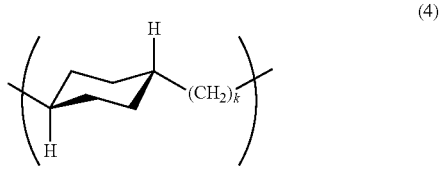

(4)

wherein k represents a natural number in a range of 2 to 20.

11. The method as set forth in claim 7, wherein the polymerization is carried out in presence of a catalyst prepared by putting a boron compound and a transition metal compound in contact with each other.

12. The method as set forth in claim 11, wherein:
the transition metal compound is represented by a following formula (7):

[Chem. 11]

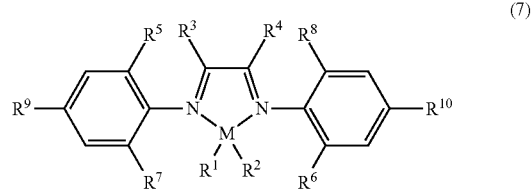

(7)

wherein: M represents an iron atom, a cobalt atom, a nickel atom, a palladium atom, or a copper atom; each of $R^1$ and $R^2$ independently represents a hydrogen atom, a halogen atom, an alkyl group, an aralkyl group, an aryl group, an alkoxy group, an aralkyloxy group, or an aryloxy group; each of $R^3$ to $R^{10}$ independently represents a hydrogen atom, a halogen atom, an alkyl group, an aralkyl group, an aryl group, an alkoxy group, an aralkyloxy group, an aryloxy group, an acyl group, an alkoxycarbonyl group, an aralkyloxycarbonyl group, an aryloxycarbonyl group, an amino group, an amide group, or a hydrocarbon thio group; and $R^3$ and $R^4$ may be bonded to each other.

* * * * *